United States Patent [19]
Einhorn

[11] Patent Number: 6,003,990
[45] Date of Patent: Dec. 21, 1999

[54] PRESS-ON LENSES FOR RELIEVING COMPUTER RELATED EYE PROBLEMS

[76] Inventor: Norman Einhorn, 613 10$^{th}$ Ave., Belmar, N.J. 07719

[21] Appl. No.: 09/160,987

[22] Filed: Sep. 25, 1998

[51] Int. Cl.$^6$ .................................................... G02C 7/16
[52] U.S. Cl. .................................. 351/45; 351/46; 351/47
[58] Field of Search .................................. 351/47, 57, 48, 351/58, 45, 46, 44, 41

[56] References Cited

U.S. PATENT DOCUMENTS

| | | |
|---|---|---|
| D. 91,146 | 12/1933 | Stevens . |
| D. 153,216 | 3/1949 | Hansen ........................................ D57/1 |
| D. 305,768 | 1/1990 | Barkley .................................. D16/100 |
| D. 366,663 | 1/1996 | Metruk .................................... D16/101 |
| 1,280,515 | 10/1918 | Mauhart, Jr. . |
| 1,610,043 | 12/1926 | Fillion . |
| 2,511,329 | 6/1950 | Craig ............................................ 88/41 |
| 2,737,847 | 3/1956 | Tesauro ....................................... 88/41 |
| 3,033,359 | 5/1962 | Mercer ..................................... 206/47 |
| 3,628,854 | 12/1971 | Jampolsky ................................ 351/45 |
| 5,266,977 | 11/1993 | Linden ...................................... 351/47 |
| 5,349,393 | 9/1994 | Kreft ......................................... 351/57 |
| 5,502,516 | 3/1996 | Elterman .................................. 351/47 |
| 5,617,153 | 4/1997 | Allen et al. .............................. 351/45 |
| 5,731,862 | 3/1998 | Winkler ..................................... 351/47 |

*Primary Examiner*—Hung Xuan Dang
*Attorney, Agent, or Firm*—Mandel & Peslak, LLC; Arthur M. Peslak, Esq

[57] ABSTRACT

A temporary lens for attachment to prescription eyeglasses is disclosed. The temporary lens is attached to prescription eyeglasses by means of electrostatic force. The temporary lens contains optical components in a unique combination to relieve the vision problems associated with prolonged computer use.

10 Claims, 2 Drawing Sheets

PRESS-ON LENSES FOR RELIEVING COMPUTER RELATED EYE PROBLEMS

BACKGROUND OF THE INVENTION

The present invention is directed to providing a solution to the problems of visual stress induced by prolonged viewing of images on computer screens. Those of ordinary skill in the art refer to such images as pixillated. The particular problems of viewing these images are induced by: 1) lag of accommodation; 2) contrast sensitivity; 3) blue light spectrum glare; and 4) loss of convergence capability.

Varying degrees of eye strain have been observed in persons viewing pixillated images on computer screens. Persons viewing these images exhibit blurry vision at table top distances due to a combination of fatigue and a disrupted accommodative system. Another problem associated with staring at a computer screen for long periods of time without blinking is dry eyes. The normal response to dry eyes is reflexive tearing. Reflexive tearing itself can cause new glare problems in the same manner as a dry or dissected cornea. In addition, drying of the eyes due to staring at the computer screen can also lead to a condition known as red eyes. All of the aforementioned symptoms can also lead to headaches.

Glare from the computer monitor screen, room light and/or sun light can also cause other problems for the computer user. Among these problems are spasms of the pupils, headaches and cloudy vision.

Another problem that can arise is related to the poor contrast on a computer screen. The poor contrast can lead to poor discrimination of near and far fields of vision. The poor discrimination creates a melding effect that makes the processing of visual information more difficult. The effect slows the ability to correctly process visual information and slows the speed at which the computer user can work.

If a computer user engages in prolonged viewing and scanning of the computer screen with degraded visual information, fatigue of the ocular mot0r muscles in the eye will result. When these muscles become fatigued, both eyes no longer simultaneously view the exact same information. This effect in turn causes blur as the vision has an area around the muscles called panama area which, allows for the maintenance of fusion. As fusion slips away and the eyes fatigue, blur sets in. Initially, blinking will reset fusion by disrupting the slippage. As fatigue continues, blur of the vision degrades into an intolerable state of double vision.

The ability to address these problems in one lens would be most useful to computer users. There are presently over 70 million computer users in the United States alone according to a 1992 NIOSH study. As of 1995, eye doctors had treated over 15 million people with computer related vision problems. It is estimated that over 1 million additional persons per year will suffer from some sort of computer use related vision problem.

It is therefore an object of the present invention to provide a novel approach to treating computer induced visual stress. This object is achieved through the use of specific magnification to reduce symptoms of lag of accommodation and the use of a specific amount of prism to address convergence fatigue.

SUMMARY OF THE INVENTION

In view of the foregoing problems experienced by computer users and the disadvantages inherent in known types of corrective lenses, the present invention addresses these problems and provides a unique solution to the problems.

The present invention solves these problems by providing a temporary lens for use in combination with prescription eyeglasses to correct the vision problems experienced by computer users comprising a soft pliable lens comprising the optical components of magnification, tint, ultra violet coating, and prism. In addition, the present invention is also directed to a method of relieving the vision problems experienced by users of computers comprising attaching a temporary lens to a pair of prescription eyeglasses for the computer user wherein the temporary lens comprises a soft pliable lens comprising the optical components of magnification, tint, ultra violet coating, and prism.

DETAILED DESCRIPTION OF THE INVENTION

The present invention is directed to a press-on lens 10 that is used in conjunction with the computer user's normal eyeglasses 12. The press-on lens 10 comprises a soft polymeric materials that over lays a pair of prescription lenses and, as explained below, reduces the visual stress associated with computer usage. The press-on lens 10 comprises the following optical components: magnification, tint, ultra violet coating, and prism. The combination of these optical components has been found to alleviate the unique visual and eye problems related to prolonged computer usage.

Figure 1:
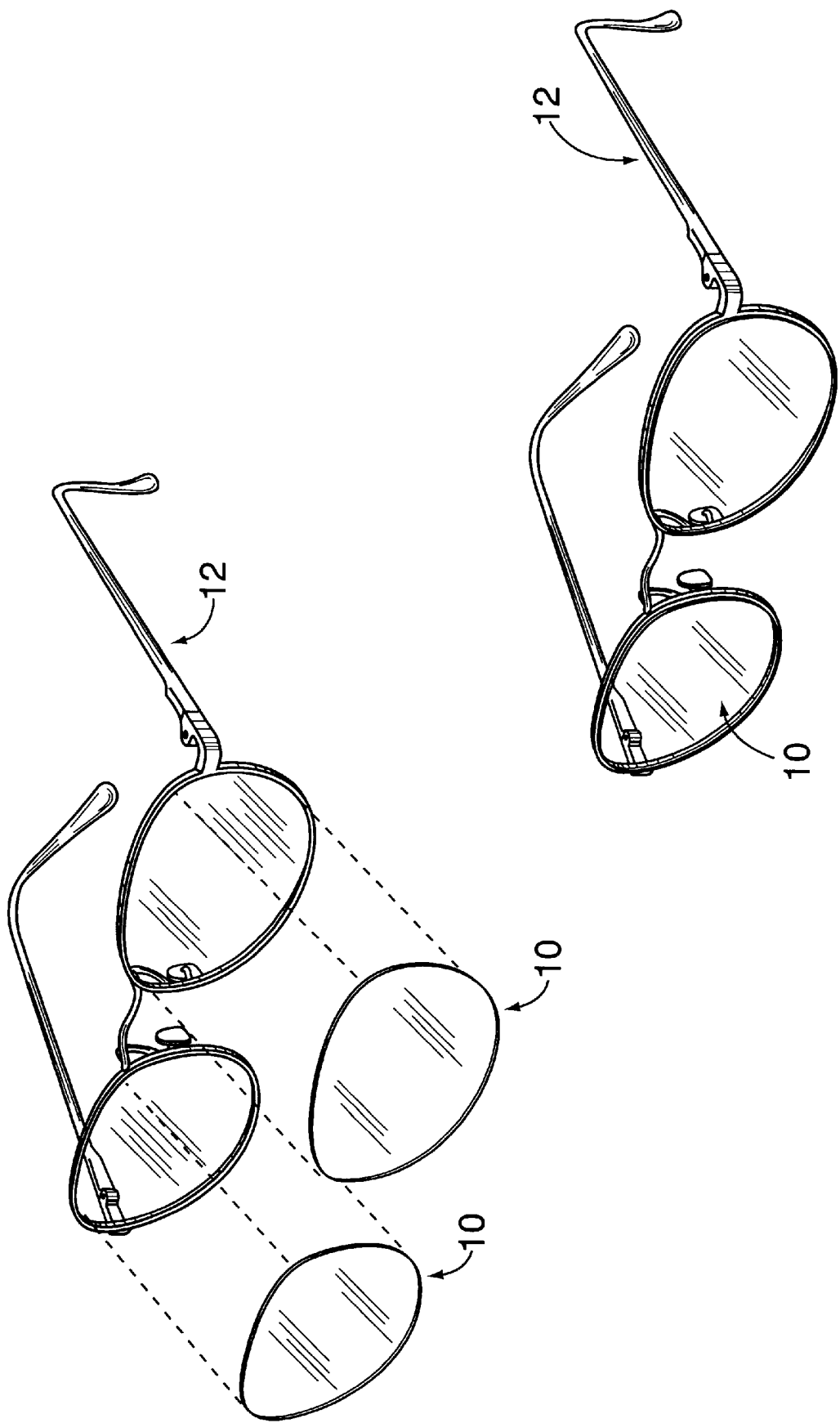
FIG. 1 is a plan view of the press-on lens of the present invention in combination with a pair of prescription eyeglasses.

The press-on lens 10 is fabricated from a soft polymeric transparent flexible material such as Tecoflex. As illustrated in FIG. 1, the preferred embodiment of the press-on lens 10 is of a round shape, has a thickness of approximately 1 mm, and a diameter of about 80 mm. The press-on lens 10 can be fabricated to fit any conventional eyeglass lens shape or portion of the lens that the computer user desires.

The press-on lens 10 comprises magnification in minimal, mild or moderate forms to address lag of accommodation of varying degrees. The use of magnification assists in reducing the stress caused by repetitive resetting of the accommodative system. If this situation is not corrected, a lag of accommodation will occur that will create blur, diploplia and/or headaches.

The press-on lens 10 also comprises a tint to enhance contrast. The use of tint as described below will enhance contrast sensitivity and diminish the negative affect of excessive room light. The tint will be sand color and a uniform 12%. The tint will enhance contrast by approximately the same amount as it absorbs light without diminishing light from the monitor or room. The sand is made of the color brown and gold which will embolden dark letters on the computer screen.

The press-on lens 10 will further comprise an ultra violet coating for glare reduction. The ultra violet coating filters certain wavelengths in the blue light spectrum. This is the type of light normally associated with glare. This type of light generally originates with ambient sources not necessarily the computer screen itself. The press-on lens 10 thereby diminishes internal glare at the cornea and in the lens of the eye. The ultra violet coating utilized in the preferred embodiment of the present invention is of the commercially available type manufactured by various manufacturers and well known to those of ordinary skill in the art.

The use of prism BI to reduce the effects of ocular fatigue allows the eye muscles to compensate for the fatigue and consequent divergence (drifting outward) that occurs with prolonged computer use. It has been determined that over the period of a day working at a computer that the ocular posture changes an average of 2.5° in the exopheric direction.

In order to create the prismatic effect with the press-on lens 10, specific manufacturing techniques are employed. The press-on lens 10 is manufactured in a mold with a decentered radius. It has been determined that the optimal amount of prism needed is 0.7° for both eyes. The amount of prism was determined by using Sheards criteria, a method known to those of ordinary skill in the art. This amount of prism is split between the two eyes as 0.36°. The current lens manufacturing technology allows for incorporation of 0.25° increments. By using 0.25° of prism, it has been found that this amount of prism will compensate for the loss of convergence that accompanies visual fatigue during computer use.

Figure 2:
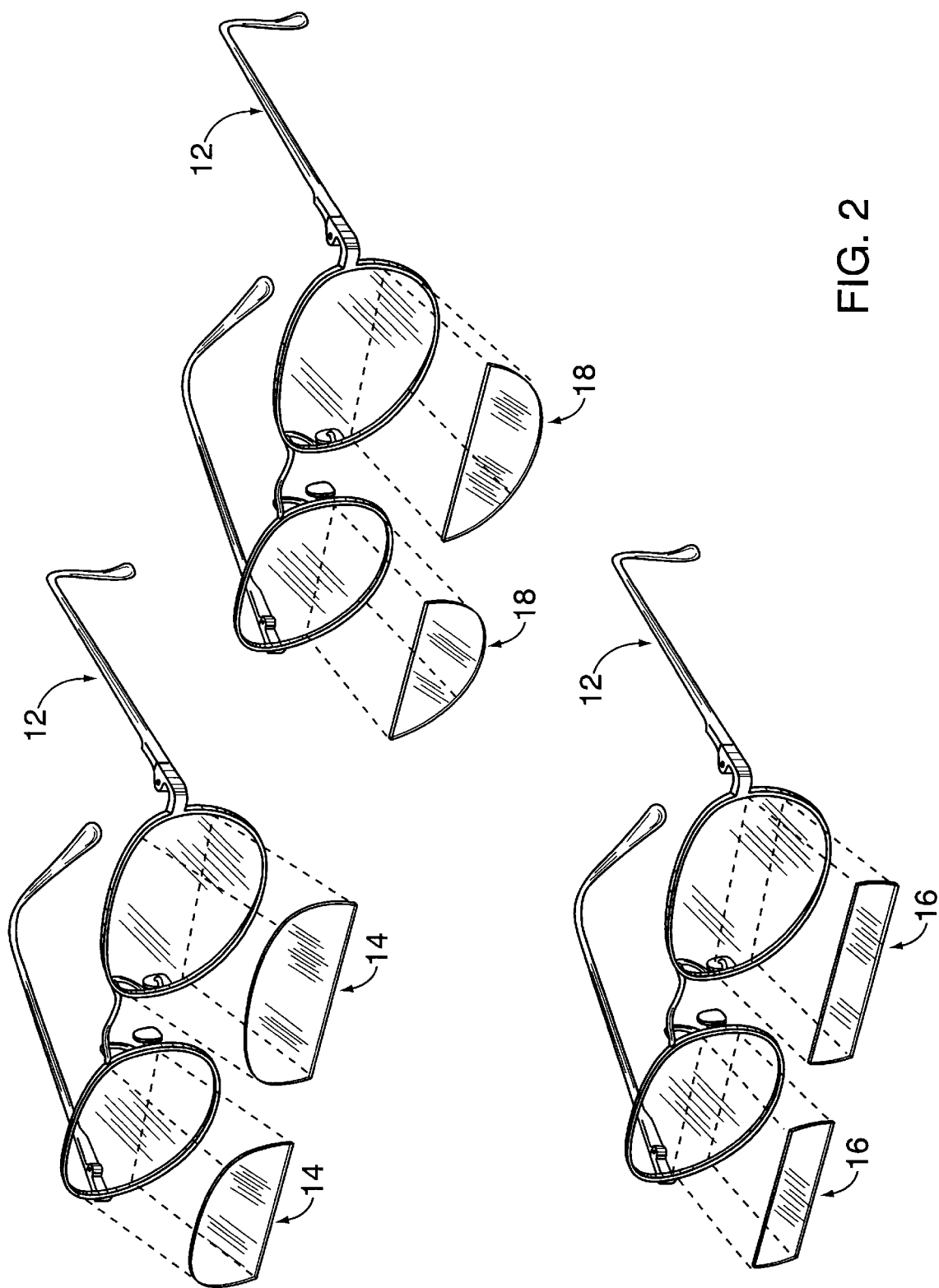
FIG. 2 illustrates alternative embodiments of the the press-on lens of the present invention in combination with a pair of prescription eyeglasses.

Due to the soft pliable nature of the press-on lens 10, the press-on lens 10 can be placed over the normal prescription lens and will remain in place by an electrostatic force created therebetween. The press-on lens 10 can be easily attached to and removed from the prescription eyeglasses without damaging the prescription lens. A typical application of the press-on lens 10 to a pair of eyeglasses is illustrated in FIG. 2. Thus, an easy and convenient method for providing this visual correction for a computer user is created. In addition, the removeable nature of the press-on lens 10 conveniently allows the computer user to utilize this vision correcting device only when needed.

FIG. 2 illustrates alternative embodiments of the present invention. While FIG. 1 illustrates an embodiment wherein the press-on lens 10 covers the entire existing eyeglass lens, the embodiments in FIG. 2 do not cover the entire eyeglass lens. The press-on lens 14 is utilized as a superior half lens on the upper portion of the existing eyeglass lens to assist relatively long distance viewing. The press-on lens 16 is utlized to assist with mid-range vision. While the press-on lens 18, is prism lens for only close distance vision assistance.

Those of ordinary skill in the art will recognize that the embodiments just described merely illustrate the principles of the present invention. Many modifications may be made thereto without departing from the spirit and scope of the invention as set forth in the following claims.

What is claimed is:

1. A temporary lens for use in combination with prescription eyeglasses to correct the vision problems experienced by computer users comprising a soft pliable lens comprising the optical components of magnification, tint, ultra violet coating, and prism.

2. The temporary lens of claim 1 wherein the temporary lens is held in place over the prescription eyeglasses by an electrostatic force.

3. The temporary lens of claim 1 wherein the prism is in the range of 0.25° to 0.50°.

4. The temporary lens of claim 3 wherein the prism is 0.25°.

5. The temporary lens of claim 1 wherein the tint comprises sand color made of a combination of brown and gold.

6. A method of relieving the vision problems experienced by users of computers comprising attaching a temporary lens to a pair of prescription eyeglasses for the computer user wherein the temporary lens comprises a soft pliable lens comprising the optical components of magnification, tint, ultra violet coating, and prism.

7. The method of claim 6 wherein the temporary lens is held in place over the prescription eyeglasses by an electrostatic force.

8. The method of claim 6 wherein the temporary lens comprises prism is in the range of 0.25° to 0.50°.

9. The method of claim 8 wherein the temporary lens comprises prism of 0.25°.

10. The method of claim 6 wherein the temporary lens comprises tint of a sand color made of a combination of brown and gold.

* * * * *